United States Patent [19]

Fossum et al.

[11] Patent Number: 5,575,276

[45] Date of Patent: Nov. 19, 1996

[54] SOLAR THERMAL WATER HEATING SYSTEM

[76] Inventors: Richard L. Fossum; Michaele J. Fossum, both of 3819 Hunters Trail, San Antonio, Tex. 78230

[21] Appl. No.: 480,688

[22] Filed: Jun. 7, 1995

Related U.S. Application Data

[63] Continuation-in-part of Ser. No. 121,442, Sep. 14, 1993, Pat. No. 5,431,149, which is a continuation of Ser. No. 922,858, Jul. 31, 1992, abandoned.

[51] Int. Cl.[6] ......................................................... F24J 2/40
[52] U.S. Cl. ........................... 126/588; 126/641; 126/661; 126/670; 126/906
[58] Field of Search ..................................... 126/588, 641, 126/642, 643, 640, 651, 652, 658, 659, 660, 661, 704–707, 906, 907

[56] References Cited

U.S. PATENT DOCUMENTS

| | | | |
|---|---|---|---|
| 3,981,293 | 9/1976 | Gillery | 126/901 |
| 4,027,652 | 6/1977 | Collura | 126/446 |
| 4,037,785 | 7/1977 | Madern | 126/641 |
| 4,120,287 | 10/1978 | Marles et al. | 126/447 |
| 4,164,935 | 8/1979 | Marles et al. | 126/447 |
| 4,172,311 | 10/1979 | Heyman | 29/157 |
| 4,178,909 | 12/1979 | Goolsby et al. | 126/417 |
| 4,217,887 | 8/1980 | Hoffman et al. | 126/906 |
| 4,255,213 | 3/1981 | Redmond | 148/6.11 |
| 4,269,167 | 5/1981 | Embree | 126/640 |
| 4,285,334 | 8/1981 | Collins | 126/641 |
| 4,325,359 | 4/1982 | Fries | 126/438 |
| 4,336,792 | 6/1982 | Seiler | 126/641 |
| 4,338,921 | 7/1982 | Harder et al. | 126/446 |
| 4,426,998 | 1/1984 | Dubosque, Jr. | 126/448 |
| 4,503,839 | 3/1985 | Dunstan | 126/643 |
| 4,574,779 | 3/1986 | Hayes | 126/643 |
| 4,867,133 | 9/1989 | Sadler | 126/906 |

FOREIGN PATENT DOCUMENTS

| | | | |
|---|---|---|---|
| 2806487 | 8/1979 | Germany | 126/446 |
| 3010268 | 9/1981 | Germany | 126/446 |
| 136056 | 8/1982 | Japan | 126/446 |

*Primary Examiner*—James C. Yeung
*Attorney, Agent, or Firm*—Gunn, Lee & Miller, PC

[57] ABSTRACT

A solar thermal water heating system including a solar collector unit, first and second heat exchangers, and a drain back tank, ordered respectively in vertically descending relation. The solar energy collector comprises a plurality of heat absorbing modules formed by deforming two plates into intimate contact with parallel metallic pipes disposed intermediate the plates. The uppermost surface of the pair of plates is provided with a black body coating to emit infrared radiation when sunlight is incident thereon. A glazing is provided over such black body surface to freely transmit incident light to the black body surface but to reflect infrared heat energy emitted by the black body surface. A pump for pumping fluid from the drain back tank to the solar collector unit is positioned horizontally adjacent the drain back tank. The first heat exchanger is vertically disposed within the water storage tank for conducting heat to potable water within the storage tank. When the system shuts down, the thermally conductive fluid drains into the first heat exchanger and drain back tank providing freeze protection for the solar collector unit.

14 Claims, 6 Drawing Sheets

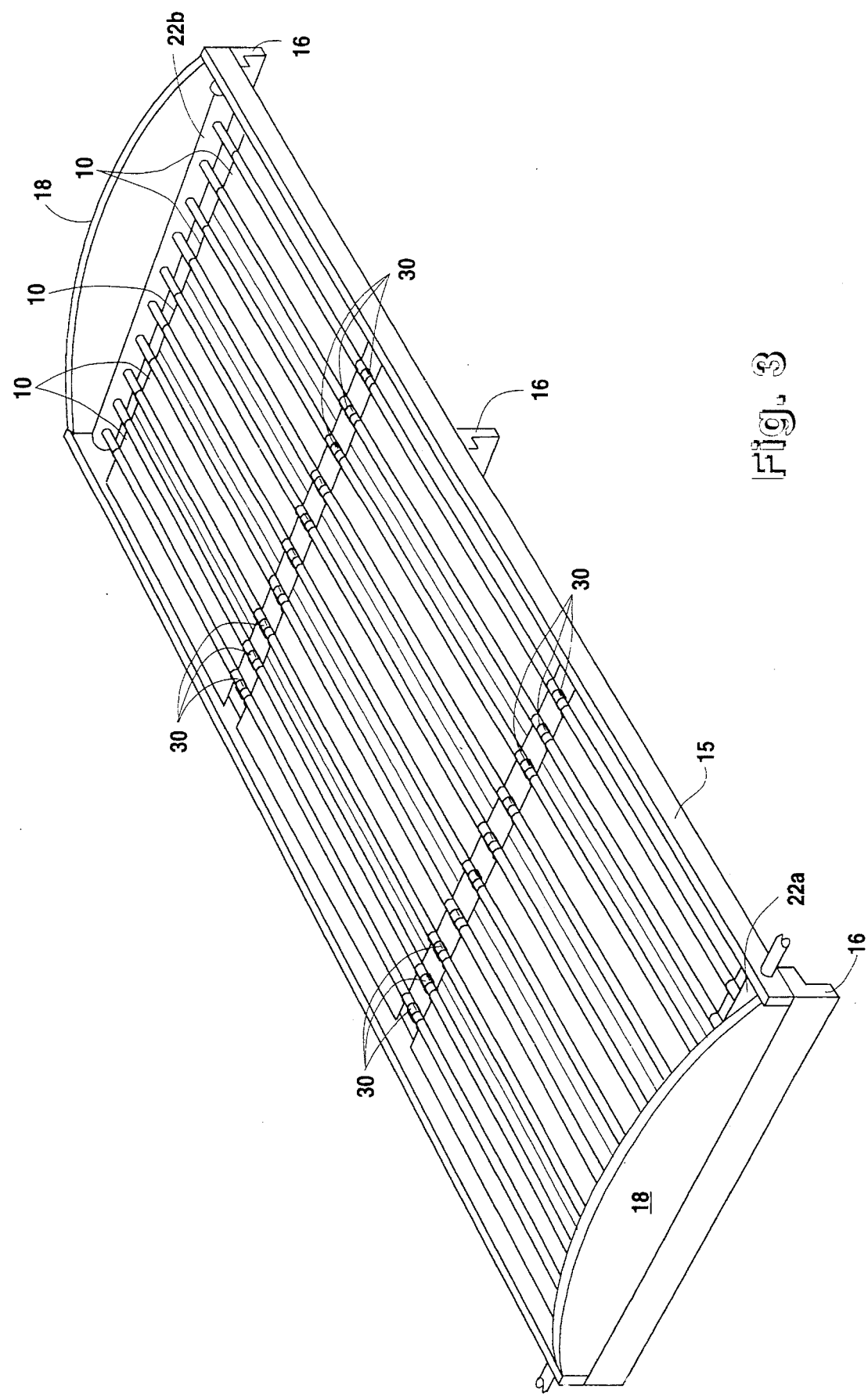

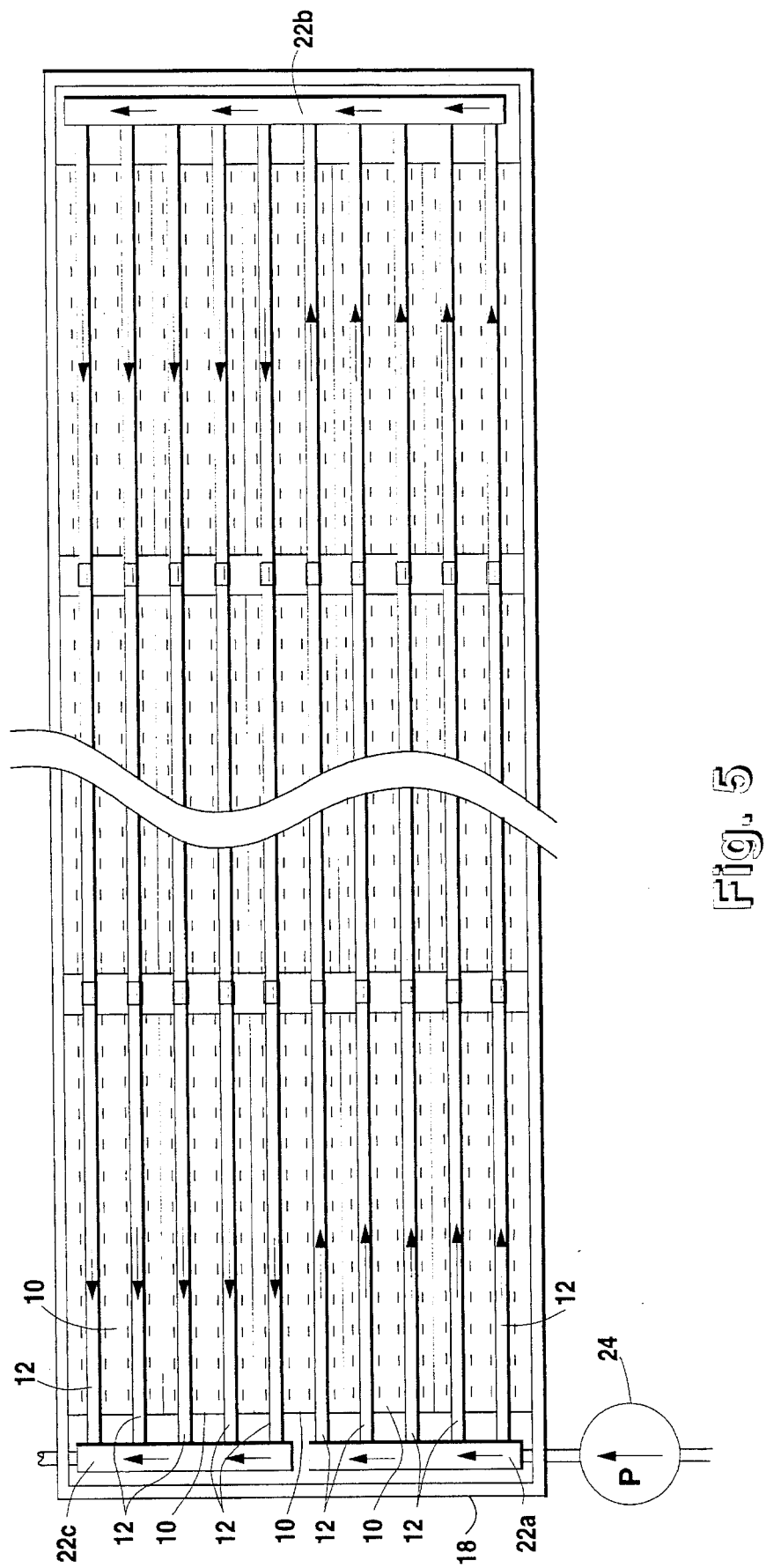

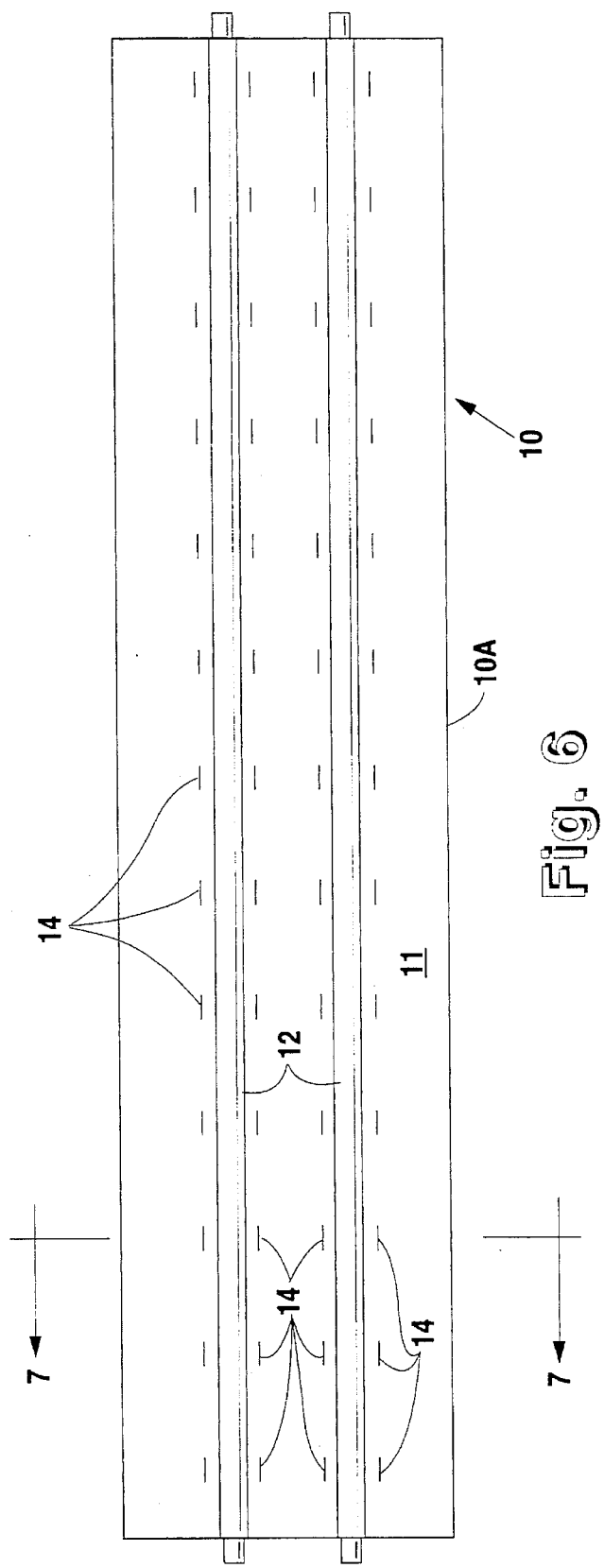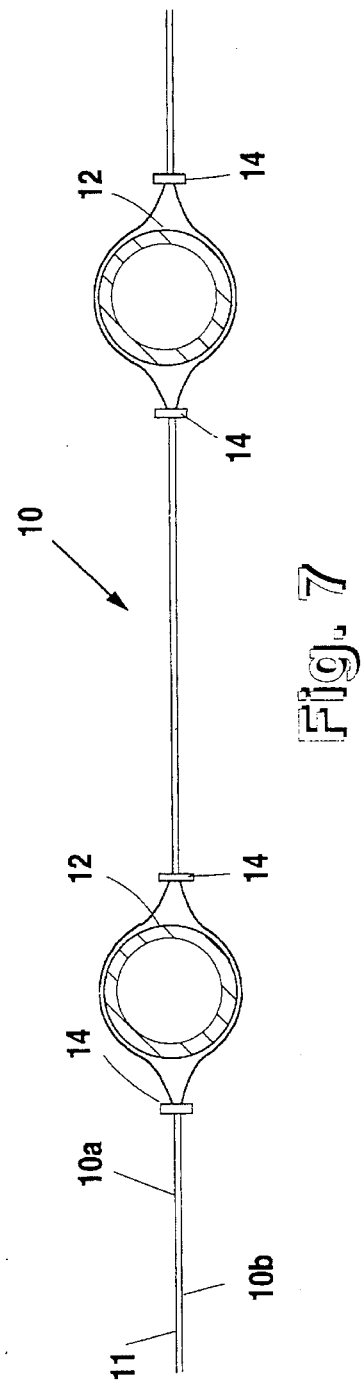

SOLAR THERMAL WATER HEATING SYSTEM

BACKGROUND OF THE INVENTION

This is a continuation in part of U.S. Ser. No. 08/121,442, filed Sep. 14, 1993, now U.S. Pat. No. 5,431,149, entitled Solar Energy Collector, which is a continuation of U.S. Ser. No. 07/922,858, filed Jul. 31, 1992 entitled "Solar Energy Collector", now abandoned.

FIELD OF THE INVENTION

This invention relates generally to Solar Thermal Water Heating Systems which employ a gravity drain back solar water heating tank for storing and utilizing the thermally conductive fluid during periods of system operation and inoperation and a solar collector for absorbing heat from incident solar energy and removing the absorbed heat by heat transfer liquid.

SUMMARY OF THE PRIOR ART

Literally hundreds of patents have been issued on apparatus for collecting, storing, and transferring of solar heat energy. Most systems employ two liquid systems, a hot water utilization system including a potable hot water storage tank having a cold water inlet and hot water outlet line, and a recirculating, solar heated fluid system including a solar collection panel, a gravity drain down tank, and a heat exchange coil. In addition, in the common forms of such apparatus, the solar energy is incident on and absorbed by a metallic plate having a so called "black body" coding thereon which effectively converts it to a back body type heat radiator. This black body surface is encased within a glazing of a transparent ceramic or plastic material and the inner surface of such glazing permits the transfer of light therethrough, but reflects back toward the heat absorbing black body plate substantially all infrared radiation emitted by the black body plate. Thus, the heat energy of the incident sunlight is trapped between the glazing and the heat absorbing black body plate. The heat developed in the black body plate is then transferred to a fluid which is generally conducted through metallic tubes or pipes lying in adjacent relationship to the black body heat absorbing plate.

In some thermal heating systems, individual components have been combined or integrated, in various ways, usually to increase freeze protection or to simplify the systems' overall complexity.

Examples of thermal solar water heating and storage systems are MORSE, U.S. Pat. No. 4,727,856; ROEHL, U.S. Pat. No. 5,159,918; KOSKELA, U.S. Pat. No. 4,562,828; and HAYES, U.S. Pat. No. 4,574,779.

Examples of common solar collectors are REDMEN, U.S. Pat. No. 4,255,213; HARDER, U.S. Pat. No. 4,338,921; FRIES, U.S. Pat. No. 4,325,359; GOOLSDY, U.S. Pat. No. 4,178,909; and HEYMAN, U.S. Pat. No. 4,172,311.

In each of the prior art patents, the need for an economical, yet efficient heat transfer and storage system is emphasized, but in every case, the prior art designs end up utilizing complicated shapes of plastic and/or metal for defining the heat absorbing element and the conduits for transmitting a heat transfer fluid in intimate relationship with the heat absorbing element. In addition, none of this art would suggest a system in which the solar collection unit, the heat exchanger unit, and the drain back tank are ordered respectively in vertically descending relation with use of a baffle plate such that water entering the drain back tank is slowed allowing heat to rise from solar storage to the water storage tank exhausting all solar energy.

With respect to a solar collector, the prior art clearly indicates the need for a modular design of solar heat collector wherein a priority of identical modules may be readily assembled to provide a large collector of any desired width or length, for use on large school, office, and similar buildings for the heating of the entire building or a large quantity of hot water, which may be readily fabricated without involving the use of a priority of separate self-contained heat absorbing modules interconnected by complex heat transfer fluids conduits, or having separate conduits leading to the source of heat transfer fluid and to the heat storage or utilization apparatus.

SUMMARY OF THE INVENTION

This invention includes a system in which a water storage tank, including an electrical backup heating system, is provided with the usual cold water input and hot water output lines.

Water within the storage tank is primarily heated by a first heat exchanger disposed vertically within the water storage tank and a second heat exchanger comprised of a concave wall positioned between the water storage tank and the drain back solar water heating tank located below the water storage tank. The first heat exchanger and second heat exchanger allow the transfer of heat by passing a fluid therethrough, heated by a solar collector unit.

The drain back tank is included to contain the solar heated fluid during times of system non-operation and to provide a reservoir from which a pump can draw the fluid for recirculation. The upper part of the drain back tank receives solar heated fluid from the first heat exchanger. The fluid must then pass a baffle plate such that the heated fluid remains at the upper part of the drain back tank allowing for transfer of heat through the concave wall and into the lower part of the water storage tank for maximum exhaustion of solar energy.

The solar collection unit, the first and second heat exchangers, and the drain back tank are ordered, respectively, in descending elevation. As a consequence, when the solar heated fluid is not being recirculated through the system, it drains by gravity into the drain back tank.

With the solar collector unit and its' inlet and outlet piping drained of fluid, freezing temperatures can be endured without damage.

It is also contemplated that the water storage tank and the drain back tank would be vertically aligned with a single, solid common dividing wall to form a single, compact unit. Therefore, this device can be installed by main stream plumbing contractors in the same general space as used by conventional water heaters, yet maximizing the potential of solar heat and minimizing the use of backup conventional heating methods.

It is also contemplated that this system will heat water primarily by conduction therefore reducing the amount of minerals forced out of the solution. A typical water heater element boils water around it causing lime to come out of the solution and build up in the tank. When water is heated by conduction the lime is not forced out of solution and does not deposit, thereby increasing the heater life.

The solar heat collector, an element of this invention, comprises one or more elongated, generally rectangular heat absorbing metallic panels, each comprising two relatively thin plates of heat absorbing metal, such as aluminum or copper, which are deformed to snugly enclose around a plurality of parallel heat transfer pipes, preferably formed of copper. Thus the upper plate of heat absorbing metal covers substantially the top semi-cylindrical portions of the heat transfer fluid conducting pipes, while the lower plate is deformed to surround the bottom semi-cylindrical portions of the fluid transfer pipes. The plates and pipes are secured together by a plurality of metallic rivets or staples, preferably of stainless steel, which traverse the two plates at locations spaced along and traversing the edges of the pipe enclosing deformed portions of the two plates. Thus, the pipes are effectively resiliently secured in position, thereby readily accommodating differences in expansion of the plate elements and the heat transfer fluid pipes.

The frame for a solar collector embodying this invention is fabricated from U-shaped stainless steel or aluminum channels which are bolted or welded together. The ends of the plate elements are bolted to opposed channels. Headers for the heat transfer fluid conduits are welded to opposite ends of the supporting plates, hence permitting a single passage of heat transfer fluid across the length of the heat absorbing plates or, by appropriate design of the internal configuration of the headers, the heat transfer fluid may be directed along one portion of the heat absorbing plates in one direction and returned along the remaining portion of the heat absorbing plates in the opposite direction to exit from the header at the same end that the heat transfer fluid entered the first mentioned header. Conventional pads of rigid foam insulation may be supported by bottom frame elements secured to the channels beneath the heat absorbing plates. A standard dimension of glazing material, such as glass or suitable transparent plastic, may be sealingly secured to the top surfaces of the channels forming the rectangular frame.

It is therefore apparent that an effective solar collector may be economically fabricated by utilizing standard shapes and sizes of existing materials, eliminating the need for expensive machining or molding of materials, and eliminating complex installation procedures. More importantly, the size of the collector may be conveniently and economically increased. For a greater width, two or more of the twin plate panels may be positioned in side by side relationship and the frame formed of U shaped channels secured together to form a rectangle of a width and length corresponding to the width and length of the assembled panels. Headers at each end of the heat transfer fluid pipes of the respective panels directs the heat transfer fluid through all the pipes and the fluid input and output can be in the same end of the combined panels.

To increase the length of the solar heat absorbing panel, two or more of the twin plate panels are placed in end to end relationship and the adjacent ends of the pipes in the panels are joined by a brazed coupling to provide an elongated heat transfer fluid conduit. By applying appropriate headers to opposite ends of the fluid conduits, the heat transfer fluid entrance to and exit from the combined panels may again be on the same end of the assembled collector. Of course, the frame formed by the U shaped channels will be appropriately lengthened and cross bracing provided if needed. The glazing elements will be the same size as that for the single panel unit, but will be interconnected at their adjacent ends by a metallic band of a sidewise H shape to accommodate thermal expansion of the glazing elements.

Further advantages of the invention will be readily apparent to those skilled in the art from the following detailed description, taken in conjunction with the annexed sheets of drawings on which is shown a preferred embodiment of the invention.

BRIEF DESCRIPTION OF DRAWINGS

FIG. 3 is a schematic perspective view of FIG. 1 with the glazing cover removed for clarity of illustration.

FIG. 5 is a schematic top elevational view of the heat transfer fluid conduits and their respective headers showing one potential direction of flow of the heat transfer fluid through the conduits.

FIG. 6 is an enlarged scale, top elevational view of a single heat absorbing panel, showing the location of the heat transfer fluid pipes and the rivets securing the heat absorbing plates and the heat transfer fluid pipes in a rigid assemblage.

FIG. 7 is an enlarged scale sectional view taken on the plane 7—7 of FIG. 6.

DESCRIPTION OF PREFERRED EMBODIMENT

SOLAR ENERGY COLLECTOR

Figure 1:
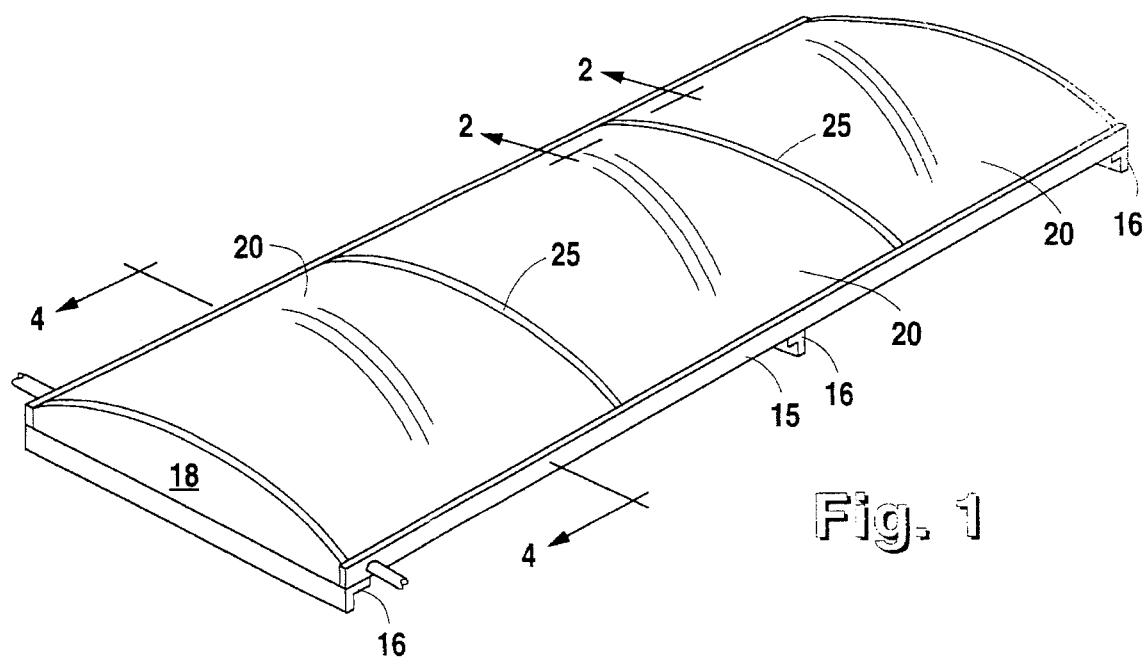
FIG. 1 is a perspective view of an assembled solar collector embodying this invention utilizing a plurality of heat absorbing panels disposed in side by side and end to end relationship.
Figure 2:
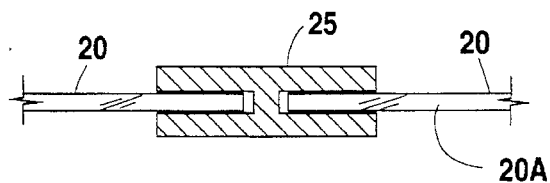
FIG. 2 is an enlarged scale, partial sectional view taken on the plane 2—2 of FIG. 1.
Figure 4:
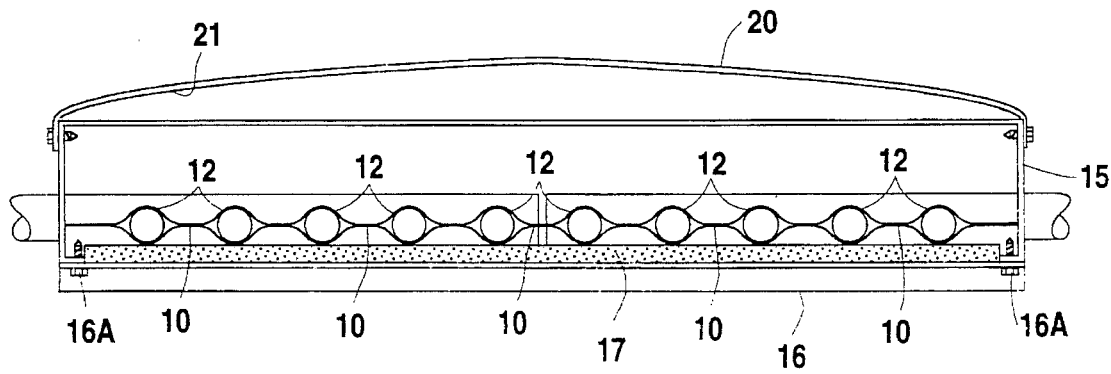
FIG. 4 is an enlarged scale sectional view taken on the plane 4—4 of FIG. 1.

The most important portion of any solar collector is the heat absorbing panel and its heat transfer relationship to the fluid transfer conduits or pipes. Referring first to FIGS. 6 and 7, there is shown a single module panel 10 having two heat transfer pipes 12 secured in intimate heat transfer relationship to the panel 10. Panel 10 actually comprises two thin plates 10a and 10b of aluminum or copper, or any other corrosive resistant metal which may be coated or treated to provide a black body heat radiating upper surface 11. The two strips 10a and 10b of such metal are preferably of a standard size such as 10" wide by 10' long. The pipes are of conventional size, say 1 to 2 inches in diameter, preferably fabricated from copper and, as shown in FIG. 6, are slightly longer than the metal plates 10a and 10b. The pipes 12 and the metal plates 10a and 10b are advanced through a simple roll type forming machine which effects the deforming of the top and bottom metal plates 10a and 10b to respectively conform to the semi-cylindrical top surfaces of the pipes 12 and the semi-cylindrical bottom surfaces of such pipes. The pipes 12 and the plates 10a and 10b are held in rigid assembly by a plurality of rivets or staples 14 which traverse the plates 10a and 10b at longitudinally spaced locations and traverse the deformed portions of the plates 10a and 10b. Thus, a spring is created by the deformed portions held by the rivets or staples 14 to permit compensation for unequal thermal expansion of the plates 10a and 10b and the pipes 12 during operation.

The upwardly facing surface of the assembled plates 10a and 10b is provided with a coating 11 which effectively converts that surface into a black body heat radiator. Such coatings are well known in the prior art.

Any number of heat absorbing panels 10, as shown in FIGS. 6 and 7, may be assembled in side by side or end to end relationship to provide a solar collector of the desired dimensions for the particular application. FIGS. 1 through 5 illustrate a solar collector having three modules connected in end to end relationship and five assemblies of three end to end connected modules of heat absorbing panels 10 mounted therein in side by side relationship. The end to end connected modules have the adjacent ends of pipes 12 connected by braised couplings 30 to provide continuous fluid paths along the entire length of the end to end connected modules.

A generally rectangular frame 15 is formed by welding channel-shaped elements, formed from aluminum or stainless steel, to form a rectangular frame conforming to the dimensions of the selected number and arrangement of modules. A plurality of bottom supports 16 may be secured by bolts 16A to frame 15 in transversely spaced relationship to assist in mounting the modules in the frame. A layer of insulation 17, such as ¾" rigid polyurethane foam or other insulating material, is placed within the frame 15 beneath the plates 10a and 10b and supported by the bottom supports 16. A chordal segment of metal 18 is secured in upstanding relation to each of the two lateral ends of the frame 15.

Standard curved pieces of glazing 20 are then secured to the top edges of the rectangular frame 15 and the upstanding chordal end elements 18 in conventional fashion. The adjacent edges of the glazing pieces 20 are mounted in arcuate bands 25 having a sidewise H-shaped configuration which permits longitudinal thermal expansion of the glazing pieces 20. Glazing pieces 20 may comprise glass or other plastic which is freely transparent to incident light. Preferably, a coating 21 is applied to the inner surface 20A of the glazing 20 which passes incident light, but accomplishes a reflection of infrared rays generated by the heating of the black body coated, heat absorbing plates 10a and 10b.

Prior to installation of the heating absorbing panels 10 within the frame 15, headers 22A and 22B are sealingly secured to opposite ends of the heat transfer pipes 12 and welded to the opposite ends of lower plate 10b (FIG. 7). While one header may be connected to an input source of cold fluid, such as water or other heat transfer fluid known in the art, and removed by the other header to a heat utilization apparatus, in the preferred form of the invention, shown in FIG. 5, the entering cold water flows through header 22A into half of the heat absorbing pipes 12 and is then transferred by a header 22B to return through the remaining pipes 12 to the opposite end of the heat absorbing unit where a third header 22C directs the hot fluid to a heat utilization apparatus (not shown). To improve the efficiency of the transfer of heat to the heat transfer liquid, a pump 24 (FIG. 5) is preferably mounted in the input line for the header 22A for the cold heat transfer liquid and such pump is operated so as to produce a sufficiently high pressure within each of the heat transfer fluid pipes 12 to result in a turbulent flow of fluid through such pipes. Such turbulent flow has been found to substantially increase the amount of heat transferred from the heat absorbing plate structure 10 to the pipes 12.

DETAILED DESCRIPTION OF SYSTEM IMPLEMENTING ELEMENTS OF PRESENT SYSTEM EMBODIMENT

Figure 8:
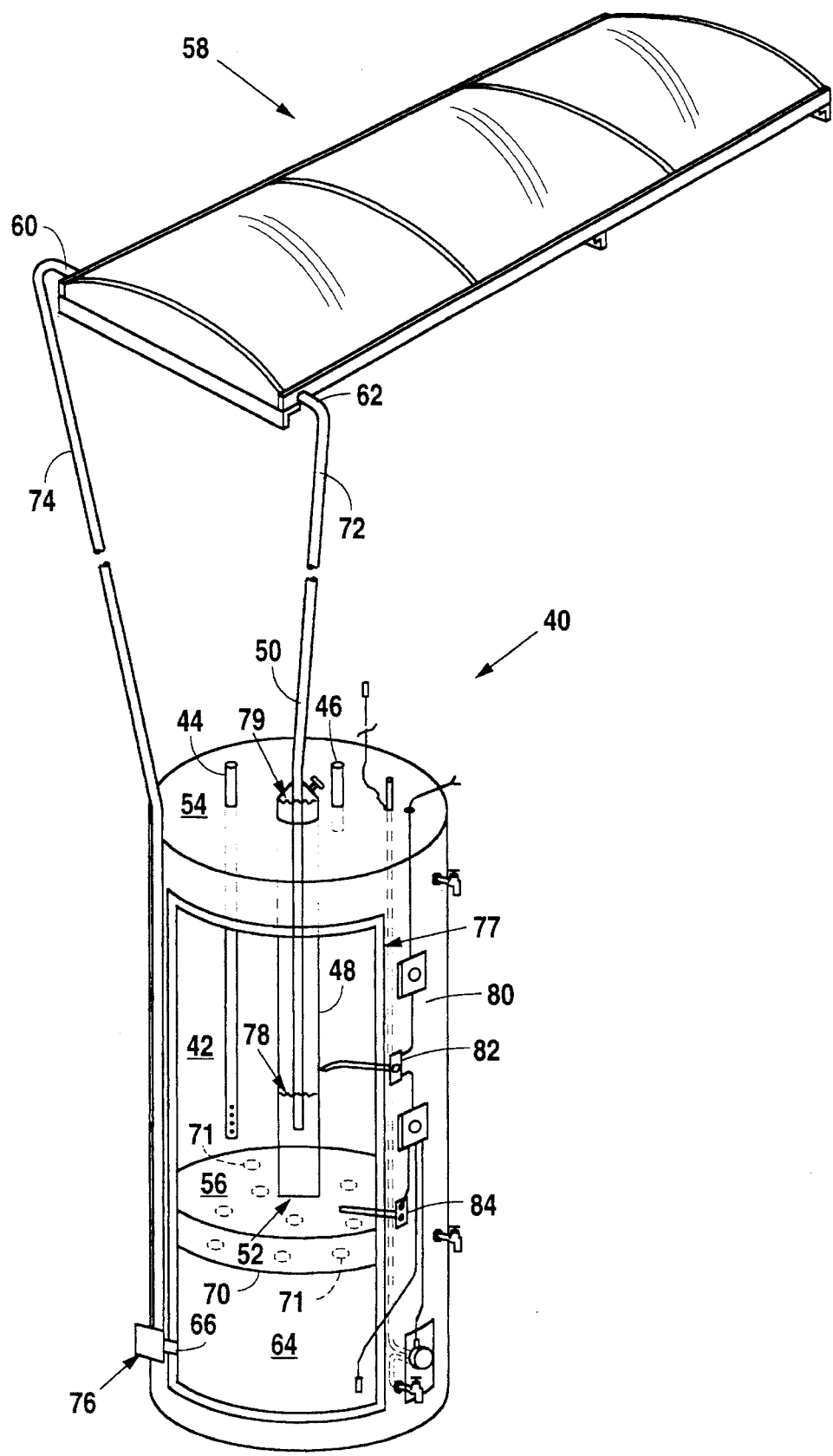
FIG. 8 is a perspective view of the solar thermal water heating system, the combined water storage tank and drain back tank assembly being depicted in cross section to reveal the internal elements.

Referring to FIG. 8, the solar thermal water heating system 40 embodying the invention includes a water storage tank 42, having a potable cold water input line 44 and a potable hot water output line 46. Input line 44 is connected to a pressurized supply of cold water and output line 46 is connected to the hot water utilization system of the user.

A first heat exchanger 48 is aligned vertically within the water storage tank 42. An upper feed end 50 and the lower discharge end 52 are included at the extremities of this first heat exchanger 48, the upper feed end 50 extending upwardly and exteriorly through the confining wall 54 of the storage tank 42, while the lower discharge end 52 extends to the bottom concave wall 56.

A solar collector unit 58 is located outdoors and at an elevation above that of any portion of the first heat exchanger 48, including the upper feed end 50. The solar collector unit 58 is provided with a cold circulation fluid inlet 60 and a hot circulation fluid outlet 62.

A drain back solar water heating tank 64, physically separated from the storage tank 42 by a concave wall 56, is located at an elevation lower than that of the first heat exchanger 48, and includes a drainpipe 66 in its' lower portion. The lower discharge end 52 of the first heat exchanger 48 extends to the concave wall 56 of the storage tank 42, ending at the drain back tank 64. Recirculation fluid travels toward the lower discharge end 52 of the first heat exchanger 48 exiting into the drain back tank 64 directly above a baffle plate 70.

The baffle plate 70 having randomly positioned apertures 71 slows the rate of flow of circulation fluid from the first heat exchanger into the upper portion of the drain back tank 64, forcing the heated circulation fluid to remain in the upper portion of the drain back tank 64 for longer than normal before passing by and through the baffle plate 70 into the primary portion of the drain back tank 64. The concave wall 56 acts as the second heat exchanger of the system allowing heat from the heated circulation fluid to continue to heat fluid in the lower portion of the water storage tank 42.

A first conduit 72 interconnects the hot circulation fluid outlet 62 of the solar collector unit 58 with the upper feed end 50 of the first heat exchanger 48. Similarly, a second conduit 74 interconnects the drainpipe 66 of the drain back tank 64 with the cold circulation fluid inlet 60 of the collector unit 58.

A fluid recirculating pump 76 is provided within the second conduit 74 at an elevation no higher than the level 78 of circulation fluid within the first heat exchanger 48, when the pump is operating.

To illustrate the operation of the system, it is helpful to follow a solar heating cycle as it progresses through a typical day. Early in the morning, the pump 76 is off, as a conventional solar control 81 and associated sensors 83 (shown in FIG. 9) determine that the solar collector unit 58 is not sufficiently heated to contribute positively to the temperature within the storage tank 42. At such time, the circulation fluid will fill the drain back tank 64 and the first heat exchanger 48, as indicated by the liquid level 79.

It is significant to note that when the system is off, the circulation fluid is contained within the first heat exchanger 48 and the drain back tank 64. Since both the storage tank 42 and the drain back tank 64 are surrounded by an envelop of insulation 77 and a closure wall 80, heat losses to the outside are kept to a minimum.

As the solar collector unit 58 heats through the morning and is eventually determined capable of making a positive heating contribution, the pump 76 is actuated to circulate the fluid throughout the system. The fluid, now heated by passage through the solar collector unit 58, flows downwardly through the first conduit 72 and into the first heat exchanger 48.

The first heat exchanger 48, which in its' preferred embodiment is centrally aligned within water storage tank 42, begins heating the cooler water within the lower portion of the storage tank 42. With an appreciable amount of heat now extracted, the fluid emerges from the discharge end 52 of first heat exchanger 48 and reenters the upper portion of drain back tank 64. Fluid exiting the first heat exchanger 48 is maintained in the upper portion of drain back tank 64 as baffle plate 70 slows the flow of fluid into the primary portion of drain back tank 64. This circulation fluid, as it exits the first heat exchanger 48, and is slowed by baffle plate 70, retains solar heat which rises through the second heat exchanger, concave wall 56, and is exchanged with fluid in water storage tank 42. The level of fluid eventually stabilizes at its' operative level 78.

As water within the storage tank 42 heats, a thermosiphon effect ensures that the hot water rises to the top of the tank 42, ready to be drawn off through the output line 46. When any hot water is utilized, cool water enters the water storage tank 42 through the input line 44 and flows around the first heat exchanger 48 and second heat exchanger, concave wall 56, providing efficient extraction of heat from the circulating fluid.

The pump 76 continues to recirculate the fluid throughout the day until at some point, a predetermined ratio between the temperature of the fluid in the solar collector unit 58 and temperature of the water within the water storage tank 42 is reached. At that moment, the pump 76 is disabled. The fluid drains downwardly under gravity through both conduit 74 and conduit 72 of the system, eventually to collect entirely within the drain back tank 64 and the first heat exchanger 48.

Since the solar collector unit 58 and exposed, outdoor portions of conduits 74 and 72 are free of any fluid, complete freeze protection is provided. In the event days go by without significant solar insolation or there is inadequate solar insolation, conventional electrical backup systems 82 and 84 are employed to heat the water within the water storage tank 42, so that normal utilization of hot water can continue. In normal operation, when the solar system is collecting energy, the water heater back-up element 82 is locked out to a preset temperature in the solar control 81 ensuring that only the water above element 82 and water level 78 in first heat exchanger 48 is heated. Therefore, when system 40 is operational, back-up element 82 never heats the solar storage tank 42 or first heat exchanger 48 yet will provide hot water above this level for consumption when the solar system cannot provide an ample supply of hot water. Back-up element 84 provides conventional heating back-up for bad weather days.

In order for the heating system of the invention 40 to function in the intended fashion, the physical relationship of the first heat exchanger 48 and the drain back tank 64 must be such that the circulation fluid drains into the first heat exchanger 48 and the drain back tank 64 when pump 76 is shut down. In other words, the tank 64 must be at an elevation lower than that of the water storage tank 42.

Figure 9:
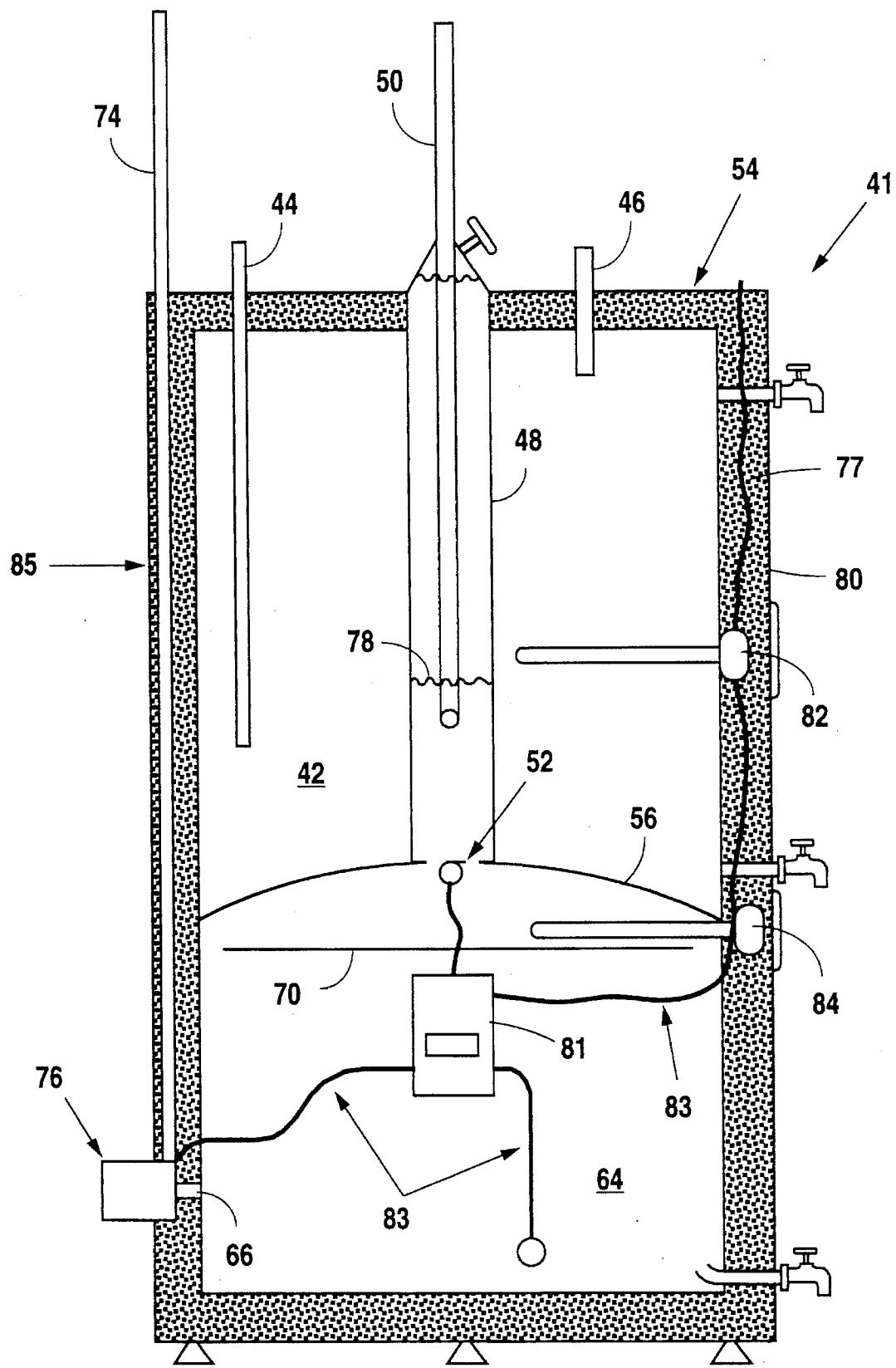
FIG. 9 is a side elevational view in cross section of the combined water storage tank and drain back tank assembly.

Referring now to FIG. 9, the solar water heating tank 41 is shown in cross sectional view. This water storage tank 41 can be installed by mainstream plumbing contractors in the same general space as used by conventional water heaters. This design, however, maximizes potential solar heat and minimizes the use of backup conventional heating methods. Back-up electric elements 82 and 84 provide backup to the solar system for required energy demands. The heating elements are positioned to eliminate lime buildup and to control maximum efficiency. Utilization of this system allows heating of water primarily by conduction reducing the amount of minerals forced out of the solution. A typical water heater element boils water around it causing lime to come out of the solution and build up in the tank. When water is heated by conduction, as in the present invention, lime is not forced out of the solution and does not deposit, increasing heater life.

In the cross sectional view of FIG. 9, the water storage tank 42 as well as drain back solar water heating tank 64 are clearly visible as contained within vertically elongated enclosure 85. Heated circulation fluid enters the tank through inlet 50 of the first heat exchanger 48. The circulating fluid travels by gravity down through the first heat exchanger 48 and to the concave wall 56 at the discharge end 52 of the first heat exchanger 48. The fluid then flows out of discharge end 52 of the first heat exchanger 48. This heated circulation fluid is slowed due to baffle plate 70 which requires the fluid to flow around and through baffle plate 70 to pass through to the primary portion of drain back tank 64. Since the heated circulated fluid slows at the upper portion of drain back tank 64, heat rises through the second heat exchanger, concave wall 56, heating fluid in the lower part of water storage tank 42.

Modifications of this invention will be readily apparent to those skilled in the art and it is intended that all such modifications be included within the scope of the appended claims.

What is claimed is:

1. A solar thermal water heating system comprising:
   (a) a water storage tank,
   (b) a first heat exchanger disposed vertically within said water storage tank and having an upper feed end and a lower discharge end,
   (c) a solar energy collector unit located above said water storage tank and having an inlet and an outlet, said solar energy collector unit comprising:
      (1) a plurality of identical rectangular heat absorbing panels which, when assembled in side by side and end to end relationship will form a total heat absorbing surface area of the desired dimensions;
      (2) each said panel comprising;
         (a) a rectangular heat absorbing plate having a top surface to receive incident solar radiation;
         (b) a black body radiation coating on said top surface; and
         (c) one or more pipes secured in heat transferring relation to the bottom surface of said heat absorbing plate;
      (3) a rectangular frame dimensioned to mount a selected plurality of said panels in side by side and end to end relation to provide the desired width and length of heat absorbing surface;
      (4) a transparent cover of glazing material overlying said plurality of panels and having the property of reflecting infrared radiation emitted by said black body coating;
      (5) means for securing said transparent cover to said rectangular frame;
      (6) means connecting the adjacent ends of said pipes to provide heat transfer fluid flow paths extending the length of said end to end panels;
      (7) header means connected to the non-adjacent ends of said pipes for directing fluid flow through all of said heat transfer flow paths;
      (8) pump means for producing turbulent flow of heat transfer fluid through all of said pipes;

(9) an inlet header connected to one end of a first set of pipes providing a fluid flow path to said first set of pipes;

(10) an outlet header connected to one end of a second set of pipes providing a fluid flow path from said second set of pipes;

(11) said inlet header and outlet header being on the same ends of said panels;

(12) said connecting means providing horizontally parallel fluid flow paths; and

(13) said header means directing fluid flow from said first set of pipes to said second sets of pipes, said second set of pipes having a fluid flow path in a direction opposite the fluid flow path of said first set of pipes;

(d) a drain back solar water heating tank located below said water storage tank, (e) a second heat exchanger comprising a concave wall positioned between said water storage tank and said drain back solar water heating tank, (f) a drain in said drain back tank, (g) a first conduit connecting said outlet of said solar energy collector and the inlet of said first heat exchanger, (h) a second conduit connecting said drain and said inlet of said solar energy collector, and (i) a pump in said second conduit for pumping said fluid from said drain through said solar collection unit and from said solar collection unit through said first conduit and said first heat exchanger and past said second heat exchanger to said drain back tank.

2. The apparatus of claim 1 further comprising a baffle plate having randomly positioned apertures, said baffle plate positioned below said concave wall within said drain back solar water heating tank for slowing the flow of fluid from said first heat exchanger into said drain back solar water heating tank for the more efficient transfer of heat through said concave wall both during and after operation of said solar thermal water heating system.

3. The apparatus of claim 1 wherein said first heat exchanger is centrally aligned within said water storage tank.

4. The apparatus of claim 1 wherein each of said heat absorbing panels comprises two vertically stacked metallic plates respectively deformed to overlie the top and bottom half portions of each of said parallel pipes in heat transfer relation thereto.

5. The apparatus of claim 1 further comprising means for allowing spring in said plates to compensate for expansion.

6. The apparatus of claim 1 further comprising a back-up heating element disposed in thermal communication with said water storage tank, said back-up element located above a level of said fluid when said pump is operating.

7. The apparatus of claim 1 further comprising a separate means for admitting other fluid to and releasing other fluid from said water storage tank.

8. A solar water heating tank comprising:

(a) a water storage tank, (b) a first heat exchanger disposed vertically within said water storage tank and having an upper feed end and a lower discharge end, a heat transfer fluid flowing from said upper feed end to said lower discharge end, said lower discharge end located below a level of said fluid during normal operation of said solar water heating tank, (c) a drain back solar water heating tank located below said water storage tank and in direct conductive heat transfer relationship so as to provide increased thermal energy transfer, (d) a second heat exchanger comprising a concave wall positioned between said water storage tank and said drain back solar water heating tank, (e) means for transfer of said fluid from said first heat exchanger to said drain back tank, (f) a drain in said drain back tank.

9. The apparatus of claim 8 further comprising a vertically elongated enclosure, said vertically elongated enclosure positioned as to completely envelope said water storage tank and said drain back solar water heating tank.

10. The apparatus of claim 9 wherein said water storage tank and said drain back solar water heating tank are stacked in vertical relation within said vertically elongated enclosure.

11. The apparatus of claim 8 further comprising a baffle plate having randomly positioned apertures, said baffle plate positioned below said concave wall within said drain back solar water heating tank for slowing the flow of fluid from said first heat exchanger into said drain back solar water heating tank for the transfer of heat through said concave wall both during and after operation of said solar thermal water heating system.

12. The apparatus of claim 8 further comprising a back up heating element disposed in thermal communication with said water storage tank, said back up element located so as not to heat fluid in said drain back solar water heating tank.

13. The apparatus of claim 8 further comprising a separate means for admitting other fluid to and releasing other fluid from said water storage tank.

14. The apparatus of claim 8 wherein said first heat exchanger is centrally aligned within said water storage tank.

* * * * *